May 3, 1960
J. M. NOBLE
2,934,881
SWEEP ATTACHMENT FOR AUGER FEED
Filed Jan. 30, 1958
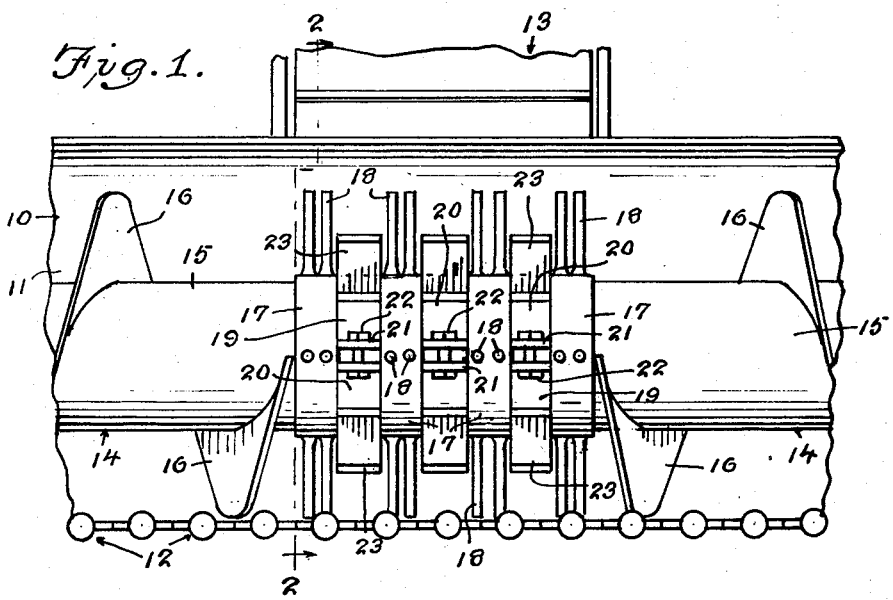
Fig. 1.
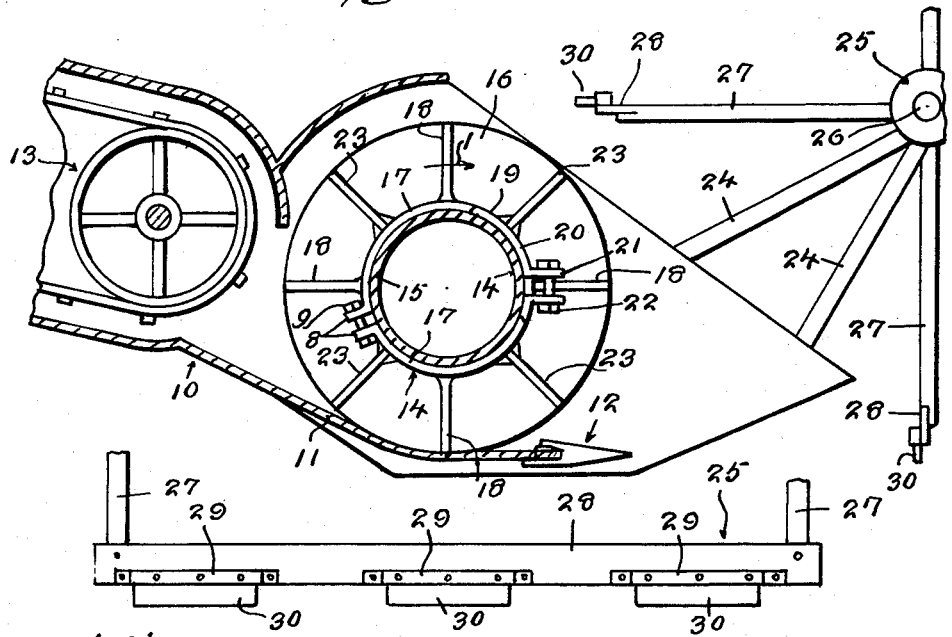
Fig. 2.
Fig. 3.
INVENTOR.
John Morgan Noble
BY *Victor J. Evans & Co.*
ATTORNEYS

United States Patent Office 2,934,881
Patented May 3, 1960

2,934,881

SWEEP ATTACHMENT FOR AUGER FEED

John Morgan Noble, Albany, Mo.

Application January 30, 1958, Serial No. 712,138

1 Claim. (Cl. 56—158)

This invention relates to agricultural equipment, and more particularly to a combine.

The object of the invention is to provide a combine which is provided with an attachment whereby clogging of the combine is minimized or prevented.

Another object of the invention is to provide a combine which includes an auger that is provided with a plurality of sweep fingers and plates so that when the combine is being used, the cut grain or other material will be effectively swept back into the elevator so that clogging or jamming up of the combine is prevented.

A further object of the invention is to provide an attachment for a combine which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a fragmentary front elevational view showing a portion of a combine equipped with the attachment of the present invention.

Figure 2 is a sectional view taken on the line 2—2 of Figure 1 and with parts broken away.

Figure 3 is an enlarged fragmentary plan view illustrating a portion of the reel.

Referring in detail to the drawings, the numeral 10 indicates a portion of a combine which includes a pan 11 and a cutter bar which is indicated generally by the numeral 12. The numeral 13 indicates a rearwardly disposed elevator, and the numeral 14 indicates an auger. The auger 14 comprises a shaft 15 which has spiral blades 16 secured thereto. It is to be noted that there are provided left and right spiral blades 16 so that the grain will be moved towards the center of the combine, and the inner portions of the blades 16 are spaced apart as shown in the drawings. The numeral 17 indicates each of a plurality of curved sleeves which are mounted on the shaft 15, and the sleeves 17 are positioned between the blades 16. Extending outwardly from each sleeve 17 and secured thereto is a plurality of spaced apart fingers 18. As shown in the drawings, the fingers 18 are arranged in pairs. Bolts 9 are connected to spaced apart ears 8 on each sleeve 17.

Mounted between the sleeves 17 are spaced parallel collars which are each indicated generally by the numeral 19, and each collar 19 includes a main circular portion 20 which terminates in a pair of spaced parallel ears 21. The ears 21 of each collar are clampingly connected together by suitable securing elements such as bolt and nut assemblies 22. Extending outwardly from each collar 19 and secured thereto in any suitable manner, is a plurality of spaced apart plates 23.

Extending forwardly from the combine are braces 24 which serve to support a reel 25, and the reel 25 is arranged forwardly of the combine and includes a shaft member 26. Rotary arms 27 are connected to the shaft member 26, and the rotary arms 27 are arranged in opposed pairs and are connected together by means of crosspieces 28. Paddles or sweeps 30 are connected to the crosspieces 28 by means of brackets 29, and the paddles 30 may be made of flexible material. The reel 25 may be operated by any suitable mechanism.

From the foregoing, it is apparent that there has been provided a mechanism for attachment to a combine whereby crops can be more conveniently harvested or handled. According to the present invention, it will be noted that sleeves 17 are mounted on the shaft 15 of the auger 14, and extending outwardly from the sleeves 17 and secured thereto is a plurality of fingers 18 which are arranged in pairs. Mounted between the sleeves 17 are spaced parallel collars 19 which are clamped onto the shaft 15 by means of the bolts 22 which extend through the ears 21. Each collar 19 has a plurality of plates 23 extending outwardly therefrom and secured thereto. It is to be noted that the fingers 18 and plates 23 are arranged between the spiral blades 16. Thus, it will be seen that as the combine moves along the field, the cutter bar 12 will be actuated so that the grain will be severed in the usual manner, and this grain will be moved inwardly by means of the spiral blades 16 of the auger 14. This grain then passes rearwardly due to the provision of the elevator 13. It will be seen that with the fingers 18 and plates 23 mounted as previously described, that as the shaft 15 turns, the fingers 18 and plates 23 will rotate or revolve in a clockwise direction, see the arrow 1 Figure 2, so that small grain or the like on the pan 11 will be swept rearwardly into the path of the elevator 13 so that such small grain will be prevented from clogging up the combine whereby it will not be necessary to frequently stop the combine and clean the same.

Furthermore, the reel 25 is mounted forwardly of the combine, and the rotary reel 25 includes the spaced apart arms 27 which have the crosspiece 28 connected thereto, and the crosspieces 28 carry paddles 30. Thus, as the reel truns, the paddles 30 will serve to engage the growing crops or grain so that this material will be directed into the path of the cutter bar 12 in a more efficient manner so as to insure that the grain will be properly cut.

The parts can be made of any suitable material and in different shapes or sizes.

By using the attachment of the present invention, it will be seen that the cut grain or material will be swept rearwardly along the pan 11 and into the path of the elevator 13 so that crops can be harvested more quickly and easily since it will not be necessary to frequently stop the combine and clean the same. The mechanism can be used on different types of combines and can be used when harvesting crops of different varieties. The mechanism can be easily attached or detached as desired. The reel 25 serves as a gathering mechanism so that the grain can be directed into the path of the cutter bar and then swept rearwardly into the elevator. The fingers 18 may be made of rigid material, and the plates 23 may be rigid. The present invention is especially suitable for sweeping small or short cuttings into the conveyor or elevator mechanism 13 so as to prevent clogging of the machine. The collars 19 are clamped on the shaft 15 by means of the bolts 22. The attachment of the present invention will prevent the combine from becoming clogged up when handling short head grain and short crops. The mechanism can be used on various types of auger feed machines and the mechanism will provide an important time saver since all of the short crops will be swept back into the feeder house so that such material will not build up and clog the combine whereby it will not be necessary to stop the combine to clean the combine out. The paddles 30 on the reel 25 also are especially suitable when harvesting head crops or short crops.

Minor changes in shape, size and rearrangement of details coming within the field of invention claimed may be resorted to in actual practice, if desired.

I claim:

In a combine including a cutter bar, a pan adjacent said cutter bar, an elevator arranged rearwardly of said pan, an auger arranged forwardly of said elevator, said auger embodying a shaft, left and right hand spiral blades on said shaft, the adjacent portions of the blades being spaced from each other, curved sleeves mounted on the shaft and disposed intermediate the adjacent portions of the blades, a plurality of spaced apart fingers extending radially from said sleeves and secured thereto, said fingers being arranged in pairs; a plurality of spaced parallel collars mounted on said shaft between said sleeves, each collar and each sleeve including a main arcuate portion terminating in spaced parallel ears, securing elements connecting adjacent ears together, a plurality of spaced apart plates extending radially from said collars and secured thereto, said plates being arranged in offset staggered relation with respect to said fingers.

References Cited in the file of this patent

UNITED STATES PATENTS

| 2,390,680 | Ausherman | Dec. 11, 1945 |
| 2,476,265 | Peterson | July 12, 1949 |
| 2,529,180 | Oehler | Nov. 7, 1950 |
| 2,691,266 | Meyer et al. | Oct. 12, 1954 |
| 2,706,032 | Kowalik | Apr. 12, 1955 |

FOREIGN PATENTS

| 187,332 | Austria | Oct. 25, 1956 |